United States Patent
Park et al.

(10) Patent No.: US 7,203,029 B2
(45) Date of Patent: Apr. 10, 2007

(54) METHOD AND APPARATUS FOR CONTROLLING TRACK SEEK SERVO OF DISK DRIVE

(75) Inventors: Seung-chul Park, Suwon-si (KR); Chang-ik Kang, Jeju-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 209 days.

(21) Appl. No.: 10/766,946

(22) Filed: Jan. 30, 2004

(65) Prior Publication Data

US 2005/0052781 A1    Mar. 10, 2005

(30) Foreign Application Priority Data

Jan. 30, 2003    (KR) .................. 10-2003-0006283

(51) Int. Cl.
*G11B 5/596* (2006.01)
(52) U.S. Cl. .................................................. 360/78.08
(58) Field of Classification Search ............... None
See application file for complete search history.

(56) References Cited

U.S. PATENT DOCUMENTS

| | | | |
|---|---|---|---|
| 6,031,684 A * | 2/2000 | Gregg | ............... 360/78.06 |
| 6,441,988 B2 | 8/2002 | Kang et al. | |
| 6,501,613 B1 | 12/2002 | Shih | |
| 6,744,590 B2 * | 6/2004 | Chu et al. | ............... 360/78.06 |
| 2001/0050827 A1 | 12/2001 | Kang et al. | |

FOREIGN PATENT DOCUMENTS

| | | |
|---|---|---|
| EP | 1 189 224 | 3/2002 |
| GB | 2 360 627 | 9/2001 |
| KR | 2001-67380 | 7/2001 |
| KR | 2002-21360 | 3/2002 |

OTHER PUBLICATIONS

The Hague, European search report, May 10, 2004, 3 pp.
Korean Office Action for corresponding Korean Appln. No. 10-2003-0006283, dated Mar. 16, 2005.

* cited by examiner

*Primary Examiner*—Hoa T. Nguyen
*Assistant Examiner*—Mitchell Slavitt
(74) *Attorney, Agent, or Firm*—Staas & Halsey LLP

(57) ABSTRACT

A method and apparatus for controlling a track seek servo of a disk drive. The method of controlling the track seek servo of the disk drive having a transducer and a disk with a plurality of tracks, includes moving a transducer to a space over a target track of the plurality of tracks according to a track seek controlling process in which an asymmetrical sine wave acceleration trajectory a(t) is used in a track seek mode.

34 Claims, 6 Drawing Sheets

NORMALIZED ACCELERATION, VELOCITY, POSITION TRAJECTORY

NORMALIZED TIME

NORMALIZED VCM VOLTAGE TRAJECTORY

NORMALIZED TIME

METHOD AND APPARATUS FOR CONTROLLING TRACK SEEK SERVO OF DISK DRIVE

CROSS-REFERENCE TO RELATED APPLICATIONS

This application claims the benefit of Korean Patent Application No. 2003-6283, filed on Jan. 30, 2003, in the Korean Intellectual Property Office, the disclosure of which is incorporated herein by reference.

BACKGROUND OF THE INVENTION

1. Field of the Invention

The present invention relates to a method and apparatus for controlling a disk drive, and, more particularly, to a method and apparatus for controlling a track seek servo of a disk drive, which reduces noise and also shortens the time required to seek a track.

2. Description of the Related Art

Hard disk drives include a plurality of magnetic transducers that can write and read data by sensing and magnetizing the magnetic fields of rotating disks. The data are stored in a plurality of sectors located in an annular track. Track numbers are located across each of the surfaces of the disks. The numbers of vertically similar tracks are referred to as cylinders. Hence, each track can be defined by a cylinder number.

Transducers are typically combined within a slider incorporated into a head gimbal assembly (HGA). Each HGA is attached to an actuator arm, which has a voice coil located adjacent to a magnetic assembly that defines a voice coil motor. Hard disk drives typically include a controller and a driving circuit that supplies current that excites the voice coil motor. An excited voice coil motor rotates the actuator arm and moves the transducers across the surface of the disks.

When data are written or read, a hard disk drive may execute a seek routine for moving transducers from one cylinder to another cylinder. During a seek routine, the voice coil motor is excited by current that moves the transducers on the disk surface to a new cylinder. A controller executes a servo routine for ensuring that the transducers are moved to the center of a track of the correct new cylinder.

It is desirable to minimize the time required to read or write data from or to a disk. Hence, in a seek routine executed by a hard disk drive, the transducers must be moved to a new cylinder within a period of time that is as small as possible. Also, the time required to stabilize an HGA must be minimized so that the transducers can quickly write or read data and can be accurately located adjacent to a new cylinder within a very short time.

Generally, transducers can be rapidly moved to a target track by performing a seek servo control using a square wave acceleration trajectory. However, because a square wave has high harmonic frequency components, the square wave causes a mechanical resonance of the HGA and excites the mechanical components or assemblies of the HGA with a high natural frequency. Residual vibration creates auditory noise and undesired vibration and requires a settling period of time to stabilize the HGA. Mechanical resonance produced by a square wave according to conventional techniques increases the time required to write or read data to or from a disk.

A conventional technique developed to solve this problem is a seek control method using a sine wave acceleration trajectory. The seek control method uses an acceleration equation, a velocity equation, and a position equation, as shown in Equations 1 to 3 below, wherein constants $K_a$, $I_a$, and $T_{sk}$ denote an acceleration constant, a current amplitude, and a track seek time, respectively.

$$a(t) = K_a I_a \sin\left(\frac{2\pi}{T_{sk}}t\right) \quad (1)$$

$$v(t) = \frac{K_a I_a T_{sk}}{2\pi}\left[1 - \cos\left(\frac{2\pi}{T_{sk}}t\right)\right] \quad (2)$$

$$x(t) = \frac{K_a I_a T_{sk}}{2\pi}\left[t - \frac{T_{sk}}{2\pi}\sin\left(\frac{2\pi}{T_{sk}}t\right)\right] \quad (3)$$

When a voice coil motor (VCM) actuator speeds up or slows down along a sine wave acceleration trajectory, acceleration, velocity, and position trajectories as shown in FIG. 4A are obtained, and a VCM voltage trajectory is created using the trajectories of FIG. 4A, as shown in FIG. 4B. The VCM voltage trajectory has an asymmetrical shape that is inclined in a positive direction because a counter-electromotive force voltage is generated in a coil of the VCM due to the rotation of the VCM actuator.

If the counter-electromotive force voltage is not generated, the shape of the VCM voltage trajectory matches that of the acceleration trajectory shown in FIG. 4A. However, as the positive counter-electromotive force voltage generated by the coil of the VCM due to the rotation of the actuator is added to the driving voltage applied to the VCM, the voltage at the VCM driving voltage input port increases by the amount of the counter-electromotive force voltage. Thus, the VCM driving voltage trajectory has an asymmetrical shape, with the minimum voltage increasing by the counter-electromotive force voltage, which is a positive value.

Because the VCM voltage trajectory is inclined in a positive direction, the seek control method using a sine wave acceleration trajectory increases track seek time by about 10% of the track seek time obtained when a square wave acceleration trajectory is used.

SUMMARY OF THE INVENTION

The present invention provides a method and apparatus for controlling a track search servo of a disk drive, by which mechanical noise is reduced and track seek time is shortened during track seek control of the hard disk drive.

According to an aspect of the present invention, there is provided a method of controlling a track seek servo of a disk drive having a transducer and a disk with a plurality of tracks, including moving a transducer to a space over a target track of the plurality of tracks according to a track seek controlling process in which an asymmetrical sine wave acceleration trajectory a(t) is used in a track seek mode.

According to another aspect of the present invention, there is provided an apparatus controlling a track seek servo of a disk drive having a transducer, a disk, and a voice coil, the apparatus including a seek trajectory producer calculating a design position value, a design velocity value, and a design acceleration value by applying an asymmetrical sine wave acceleration trajectory function a(t) in a track seek mode; a state estimator determining an actual position value, an actual velocity value, and an actual bias value of the transducer as the transducer moves over the disk; a first adder subtracting the actual position value from the design position value; a position control gain compensator obtaining a position correction value by multiplying a resultant value output from the first adder by a predetermined position gain for position correction; a second adder adding the position correction value to the design velocity value and subtracting the actual velocity value from the sum of the position correction value and the design velocity value; a velocity control gain compensator obtaining a velocity correction value by multiplying a resultant value output from the second adder by a predetermined velocity gain for velocity correction; a third adder adding the velocity correction value to the design acceleration value and subtracting the actual bias value from the sum of the velocity correction value and the design acceleration value to obtain an acceleration correction value; and an actuator varying a value of current supplied to the voice coil depending on the acceleration correction value to control movement of the transducer.

According to another aspect of the present invention, there is provided a disk drive including a disk storing data, the disk having a plurality of tracks; a spindle motor rotating the disk; a transducer writing data and reading data to and from the disk; an actuator moving the transducer over a surface of the disk; and a controller controlling the actuator to move the transducer from a space over a present track of the plurality of tracks to a space over a target track of the plurality of tracks using an asymmetrical sine wave acceleration trajectory a(t).

According to another aspect of the present invention, there is provided a computer-readable storage controlling a computer to control a track seek servo of a disk drive having a transducer and a disk with a plurality of tracks, the computer-readable storage including a process of moving a transducer to a space over a target track of the plurality of tracks according to a track seek controlling process in which an asymmetrical sine wave acceleration trajectory a(t) is used in a track seek mode.

According to another aspect of the present invention, there is provided a method of controlling a track seek servo of a disk drive having a transducer, a voice coil, and a disk with a plurality of tracks, including moving a transducer to a space over a target track of the plurality of tracks according to a track seek controlling process in which an asymmetrical sine wave current is applied to the voice coil in a track seek mode.

According to another aspect of the present invention, there is provided a disk drive including a disk storing data, the disk having a plurality of tracks and a voice coil; a spindle motor rotating the disk; a transducer writing data and reading data to and from the disk; an actuator moving the transducer over a surface of the disk; and a controller controlling the actuator to move the transducer from a space over a present track of the plurality of tracks to a space over a target track of the plurality of tracks by applying an asymmetrical sine wave current to the voice coil.

According to another aspect of the present invention, there is provided a computer-readable storage controlling a computer to control a track seek servo of a disk drive having a transducer, a plurality of tracks, and a voice coil, the computer-readable storage including a process of moving a transducer to a space over a target track of the plurality of tracks according to a track seek controlling process in which an asymmetrical sine wave current is applied to the voice coil in a track seek mode.

According to another aspect of the present invention, there is provided an electrical system controlling a hard disk drive having a transducer, a voice coil motor with a voice coil, and a disk with a plurality of tracks, the electrical system including a controller controlling movement of the transducer from a current one of the tracks to a target one of the tracks using an asymmetrical sine wave acceleration trajectory; a read/write channel connected to the controller and receiving a control signal from the controller to read data from, or write data to, the disk; and a voice coil motor driver, the controller supplying a driving current to the voice coil and supplying a control signal to the voice coil motor driver to control movement of the transducer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments taken in conjunction with the accompanying drawings, of which.

DETAILED DESCRIPTION OF THE PREFERRED EMBODIMENT

Figure 1:
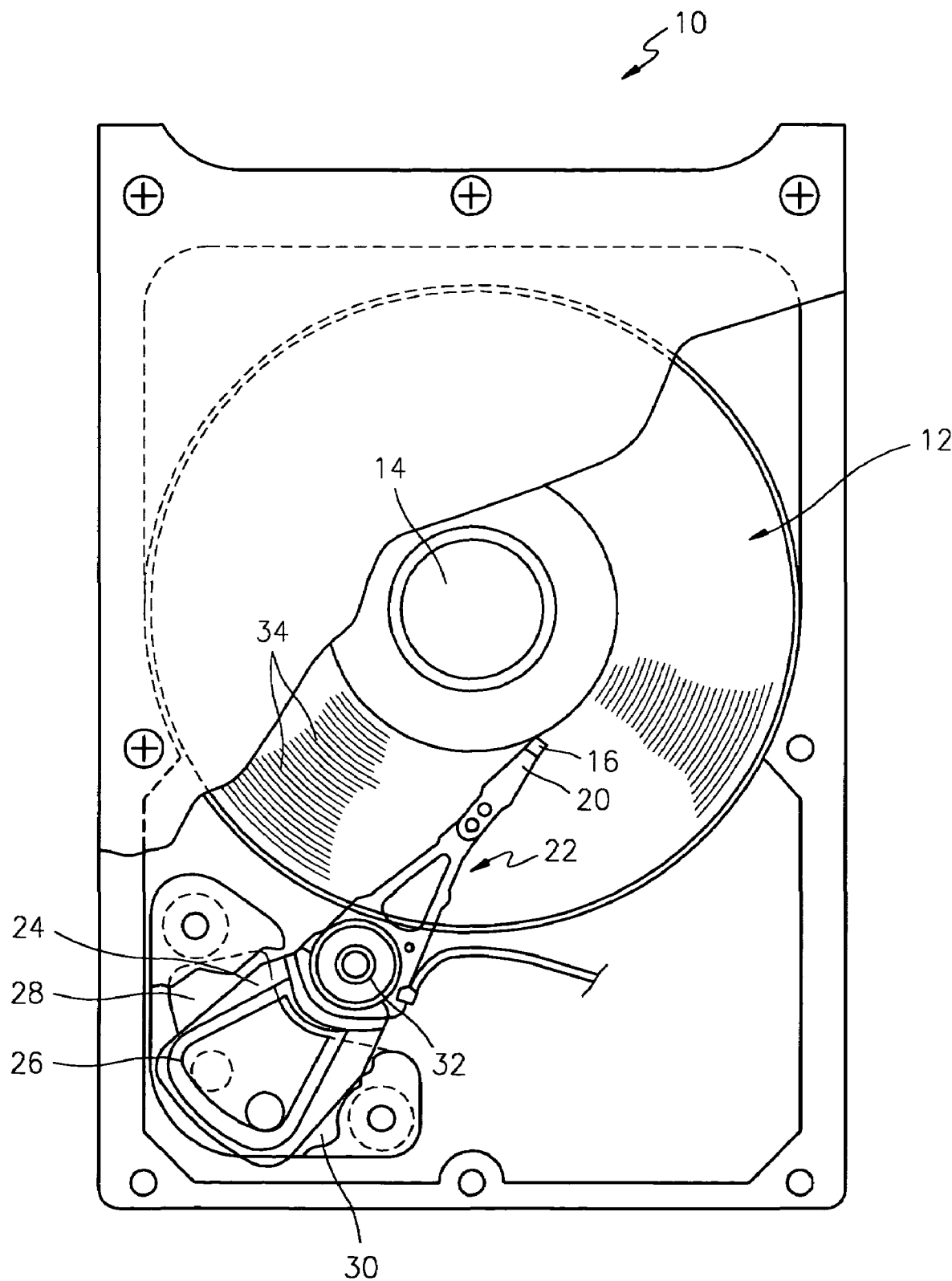
FIG. 1 is a plan view showing the structure of a hard disk drive to which the present invention is applied.

Reference will now be made in detail to the embodiment of the present invention, examples of which are illustrated in the accompanying drawings, wherein like reference numerals refer to the like elements throughout. The embodiment is described below to explain the present invention by referring to the figures.

Referring to FIG. 1, a hard disk drive 10, to which the present invention is applied, includes at least one magnetic disk 12, which is rotated by a spindle motor 14. The hard disk drive 10 also includes a transducer 16, which is adjacent to the surface of the magnetic disk 12.

The transducer 16 can write data or read data to or from the rotating disk 12 by magnetizing and sensing the magnetic field of the disk 12. The transducer 16 is typically associated with the surface of the disk 12. The transducer 16 includes a writing transducer (not shown) for magnetizing the disk 12 and a reading transducer (not shown) for sensing the magnetic field of the disk 12. The reading transducer is made from a magneto-resistive (MR) element.

The transducer 16 is incorporated into a slider 20, which generates an air bearing in a space between the transducer 16 and the surface of the disk 12. The slider 20 is incorporated into a head gimbal assembly (HGA) 22. The HGA 22 is attached to an actuator arm 24 having a voice coil 26. The voice coil 26 is adjacent to a magnetic assembly 28, which together define a voice coil motor (VCM) 30. The current supplied to the voice coil 26 creates torque that rotates the actuator arm 24 around a bearing assembly 32. The rotation of the actuator arm 24 moves the transducer 16 across the surface of the disk 12.

Information is typically stored in annular tracks 34 of the disk 12. Each of the tracks 34 generally includes a plurality of sectors, each of which includes a data field and an identification field. The identification field includes gray codes that identify sectors and tracks (cylinders). The transducer 16 moves across the surface of the disk 12 to read or write data from or to a track 34.

Figure 2:
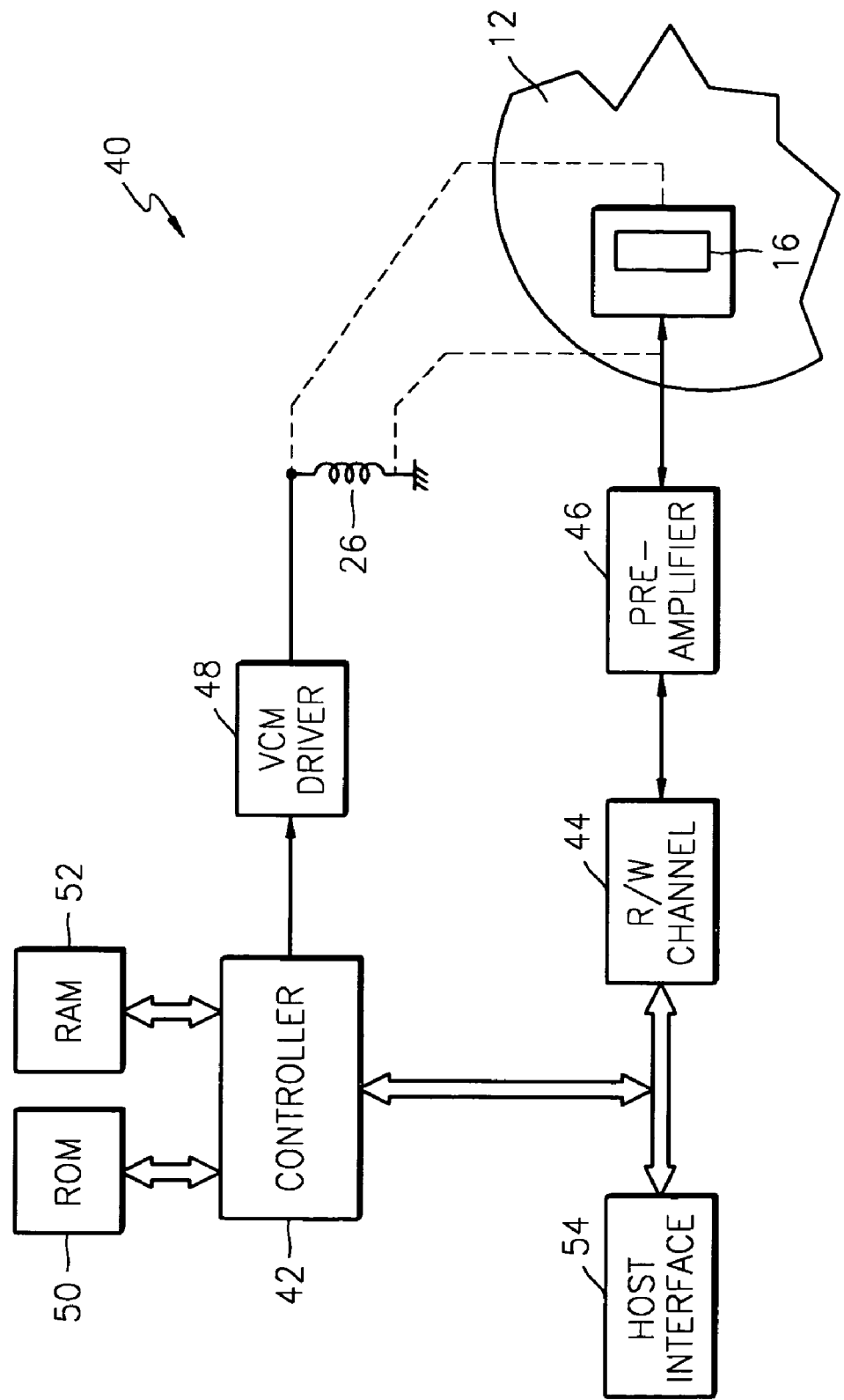
FIG. 2 is a circuit diagram of an electrical system that controls the hard disk drive of FIG. 1.

FIG. 2 shows an electrical system 40 capable of controlling the hard disk drive 10. The electrical system 40 includes a controller 42, which is combined with the transducer 16 via a read/write (R/W) channel 44 and a pre-amplifier 46. The controller 42 can be a digital signal processor (DSP), a micro-processor, a micro-controller, etc. The controller 42 applies a control signal to the R/W channel 44 to read data or write data from or to the disk 12. The data are typically transferred from the R/W channel 44 to a host interface 54. The host interface 54 includes a buffer memory and a control circuit that allow the disk drive 10 to interface with a system such as a personal computer.

The controller 42 is also combined with a VCM driver 48, which supplies a driving current to the voice coil 26. The controller 42 supplies a control signal to the VCM driver 48 to excite the VCM 30 of FIG. 1 and to control the motion of the transducer 16.

The controller 42 is connected to a non-volatile memory, such as a read only memory (ROM) 50 or a flash memory, and a random access memory (RAM) 52. The ROM 50 and RAM 52 store instructions and data that are used by the controller 42 to execute a software routine. An example of the software routine is a seek routine for moving the transducer 16 from one track to another track. The seek routine includes a servo control routine for ensuring that the transducer 16 moves to a correct track. The ROM 50 contains acceleration, velocity, and position trajectory equations according to the embodiment of the present invention, and, as described below, the RAM 52 receives and stores these equations from the ROM 50 when the driving current is initially supplied.

Figure 3:
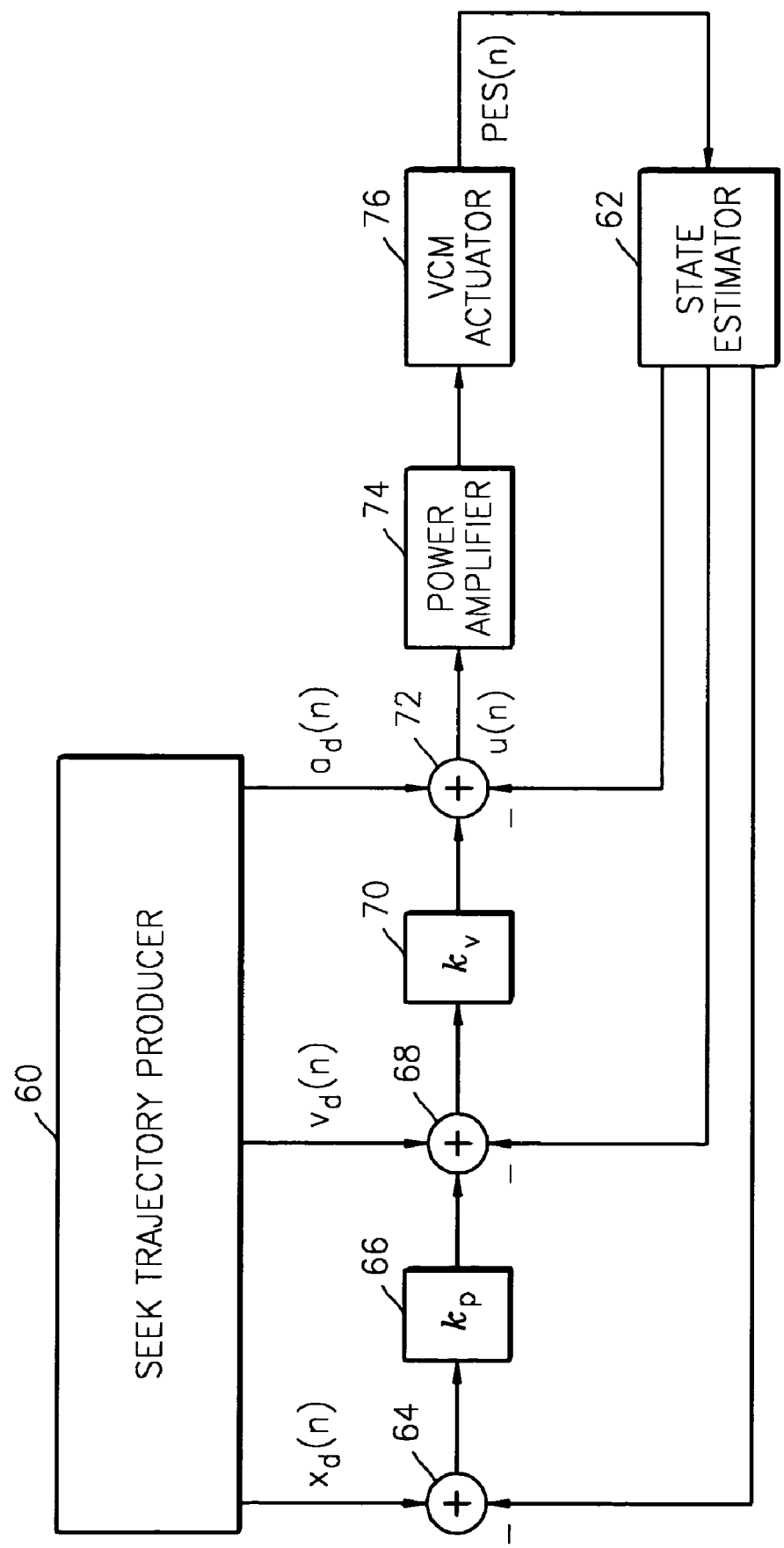
FIG. 3 is a circuit diagram of a servo control system of the hard disk drive of FIG. 1.
Figure 4A:
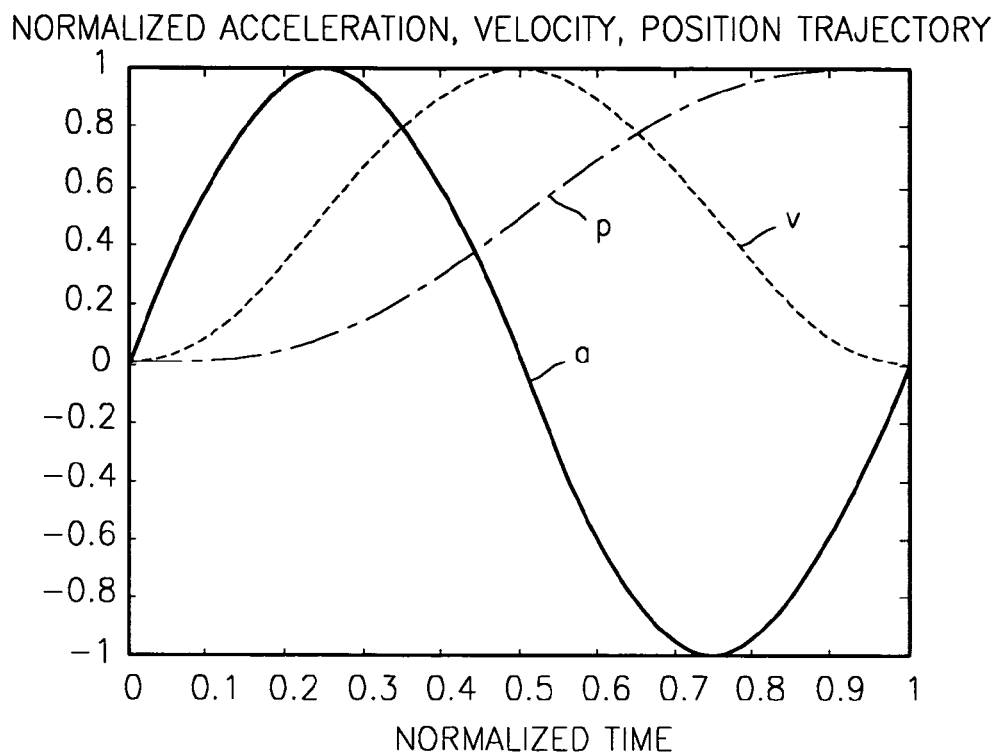
FIG. 4A shows position, velocity, and acceleration trajectories created by a conventional seek technique.
Figure 4B:
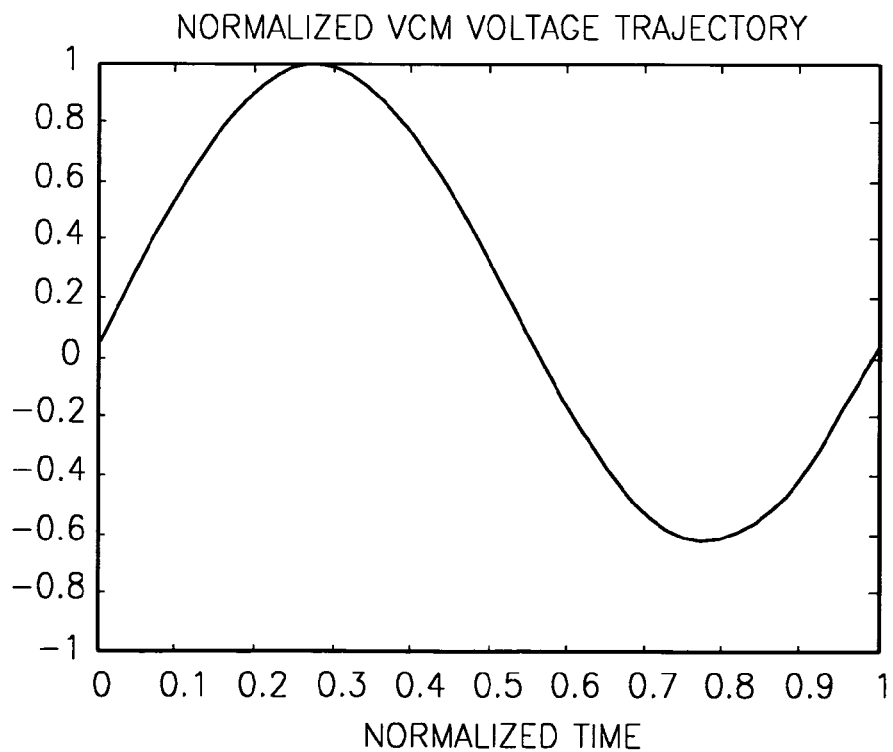
FIG. 4B shows a VCM voltage trajectory created by the conventional seek technique of FIG. 4A.

FIG. 3 shows a track seek servo control system that is implemented in hardware or software and operated by the controller 42. The track seek servo control system drives the transducer 16 to accurately locate the transducer 16 over a target track 34 of the disk 12. The controller 42 executes the seek routine that moves the transducer 16 from a first track to a new track that is a seek distance $X_{SK}$ away from the first track. The gray codes of at least one track between the first track and the new track are read by the transducer 16 that moves across the disk 12. The read gray codes are used by the controller 42 to periodically determine whether the transducer 16 moves across tracks 34 at a target velocity and at a target acceleration.

The track seek servo control system includes a state estimator 62 implemented in hardware or software. The state estimator 62 can determine an actual distance by which, or an actual position to which, the transducer 16 is moved from the first track. The actual position is determined by reading out the gray codes of the track directly under the transducer 16. The state estimator 62 can also determine an actual velocity value and an actual bias value of the transducer 16. The gray codes are periodically sampled as the transducer 16 moves to a new track location. Hence, the controller 42 accurately controls the motion of the transducer 16.

A seek trajectory producer 60 calculates a design position $x_d(n)$, a design velocity $v_d(n)$, and a design acceleration $a_d(n)$, by applying an asymmetrical sine wave acceleration trajectory function each time the transducer 16 reads out the gray codes of a track 34.

A first adder 64 subtracts an actual position value from the design position value $x_d(n)$. A position control gain compensator 66 obtains a position correction value by multiplying the difference between the design position value and the actual position value by a position gain $k_p$ for position correction.

A second adder 68 adds the position correction value to the design velocity value and subtracts an actual velocity value from the sum of the position correction value and the design velocity value.

Then, a velocity control gain compensator 70 obtains a velocity correction value by multiplying the difference between the design velocity value and the actual velocity value by a velocity gain $k_v$ for velocity correction.

Thereafter, a third adder 72 adds the velocity correction value to the design acceleration value and subtracts an actual bias value from the sum of the velocity correction value and the design acceleration value to obtain an acceleration correction value u(n).

The acceleration correction value u(n) is amplified by a power amplifier 74, and the amplified acceleration correction value u(n) is applied to a VCM actuator 76. Then, the VCM actuator 76 varies the value of current supplied to the voice coil 26 depending on the amplified acceleration correction value u(n) and consequently varies an acceleration at which the transducer 16 moves. Accordingly, an acceleration trajectory has the same shape as a current trajectory when applied to the voice coil 26.

Figure 5A:
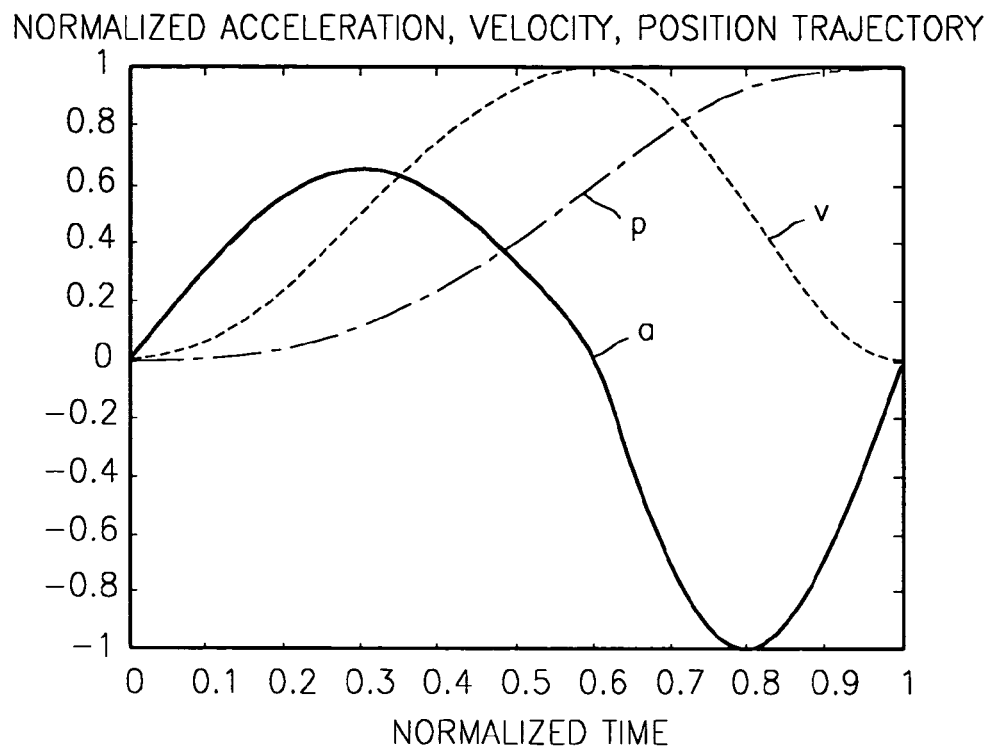
FIG. 5A shows position, velocity, and acceleration trajectories created by a seek technique according to an embodiment of the present invention.

In other words, the current applied to the voice coil 26 has an asymmetrical sine wave trajectory similar to the acceleration trajectory shown in FIG. 5A. To be more specific, in the asymmetrical sine wave acceleration trajectory of FIG. 5A, the absolute value of the negative peak is greater than the value of the positive peak, and the negative portion of the trajectory has a shorter duration than the positive portion of the trajectory.

The trajectories of the design acceleration, design velocity, and design position supplied to the first adder 64, the second adder 68, and the third adder 72, respectively, are described below.

The present invention uses an asymmetrical sine wave acceleration trajectory, in which a deceleration is greater than an acceleration, to increase the amount of decelerating current within a voltage limit that is given in consideration of a counter-electromotive force produced by a coil due to the rotation of an actuator.

The acceleration trajectory used in the embodiment of the present invention, and the velocity and position trajectories based on the acceleration trajectory, are given by Equations 4, 5, and 6 below:

$$a(t) = \begin{cases} K_a I_a \sin\left[\dfrac{\pi}{T_a} t\right], & 0 \leq t \leq T_a \\ -K_a I_d \sin\left(\dfrac{\pi}{T_d}(t - T_a)\right), & T_a \leq t \leq T_a + T_d \end{cases} \quad (4)$$

$$v(t) = \begin{cases} \dfrac{K_a I_a T_a}{\pi}\left[1 - \cos\left(\dfrac{\pi}{T_a} t\right)\right], & 0 \leq t \leq T_a \\ \dfrac{2K_a I_a T_a}{\pi} + \dfrac{K_a I_d T_d}{\pi}\left[\cos\left(\dfrac{\pi}{T_d}(t - T_a)\right) - 1\right], & T_a \leq t \leq T_a + T_d \end{cases} \quad (5)$$

$$x(t) = \begin{cases} \dfrac{K_a I_a T_a}{\pi}\left[t - \dfrac{T_a}{\pi}\sin\left(\dfrac{\pi}{T_a} t\right)\right], & 0 \leq t \leq T_a \\ \dfrac{K_a I_a T_a^2}{\pi} + \dfrac{2K_a I_a T_a - K_a I_d T_d}{\pi}(t - T_a) + \dfrac{K_a I_d T_d^2}{\pi^2}\sin\left(\dfrac{\pi}{T_d}(t - T_a)\right), & T_a \leq t \leq T_a + T_d \end{cases} \quad (6)$$

wherein $I_a$, $I_d$, $T_a$, and $T_d$ denote an acceleration current amplitude, a deceleration current amplitude, an acceleration time, and a deceleration time, respectively. These four parameters are determined by using Equations 7, 8, 10, and 11 shown below.

Equation 7 is obtained based on a condition that the velocity is zero upon completion of a track seek:

$$v(T_a + T_d) = \frac{2K_a}{\pi}(I_a T_a - I_d T_d) = 0 \quad (7)$$

Equation 8 is obtained based on the relationship between the seek distance $X_{sk}$ and a seek time $T_{sk}$:

$$X_S = x(T_a + T_d) = \frac{K_a I_a T_a}{\pi}(T_a + T_d) \quad (8)$$

A VCM voltage required using the trajectories given by Equations 4, 5, and 6 is given by Equation 9:

$$u(t) = L\frac{di}{dt} + Ri + K_e v \quad (9)$$

$$= \begin{cases} \dfrac{K_e K_t I_a T_a}{M\pi} + RI_a \sin\left(\dfrac{\pi}{T_a} t\right) + \left(\dfrac{L\pi I_a}{T_a} - \dfrac{K_e K_t I_a T_a}{M\pi}\right)\cos\left(\dfrac{\pi}{T_a} t\right), & 0 \leq t \leq T_a \\ \dfrac{K_e K_t I_d T_d}{M\pi} - RI_d \sin\left(\dfrac{\pi}{T_a}(t - T_a)\right) - \left(\dfrac{L\pi I_d}{T_d} - \dfrac{K_e K_t I_d T_d}{M\pi}\right)\cos\left(\dfrac{\pi}{T_d}(t - T_a)\right), & T_a \leq t \leq T_a + T_d \end{cases}$$

wherein constants L, R, and $K_e$ denote the inductance, resistance, and counter-electromotive force constant of a VCM coil, respectively.

Equation 10 is obtained from the condition, $$\left(\max_{0 \leq t \leq T_a} u(t) = U_m\right),$$

that a maximum voltage is used during acceleration within the limit ($U_m$):

$$\frac{2K_e K_t U_m}{M\pi I_a} T_a^3 + \left(R^2 - \frac{2LK_e K_t}{M} - \left(\frac{U_m}{I_a}\right)^2\right)T_a^2 + L^2\pi^2 = 0 \quad (10)$$

Equation 11 is obtained from the condition, $$\left(\min_{t_a \leq t \leq T_a + T_d} u(t) = -U_m\right),$$

that a maximum voltage is used during deceleration within the limit ($U_m$):

$$\frac{2K_e K_t U_m}{M\pi I_a} T_a^3 - \left(R^2 - \frac{2LK_e K_t}{M} - \left(\frac{U_m}{I_a}\right)^2\right)T_a^2 - L^2\pi^2 = 0 \quad (11)$$

Figure 5B:
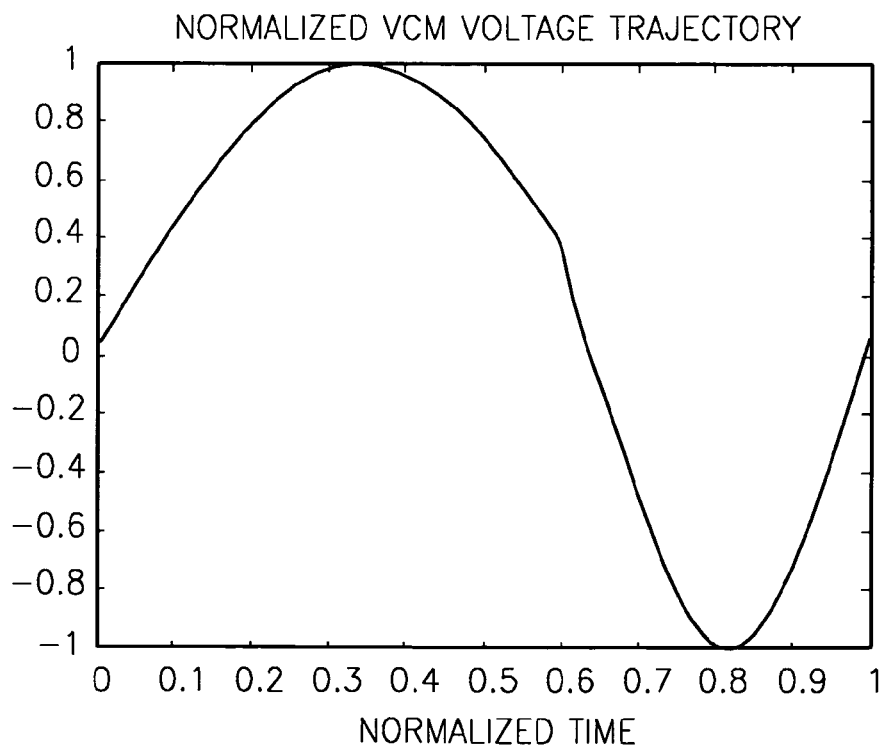
FIG. 5B shows a VCM voltage trajectory created by the seek technique according to the embodiment of the present invention, as represented by the trajectories of FIG. 5A.

Parameters $I_a$, $I_d$, $T_a$, and $T_d$ used in Equations 4, 5, and 6 are determined by simultaneously solving Equations 7, 8, 10, and 11. The determined acceleration, velocity, and position trajectories are shown in FIG. 5A, and a VCM voltage trajectory is shown in FIG. 5B. As shown in FIG. 5A, the acceleration trajectory indicated by "a" has an asymmetrical shape in which the degree of acceleration is less than the degree of deceleration and the acceleration section has a greater duration than the deceleration section.

The VCM voltage trajectory of FIG. 5B has about the same shape as the acceleration trajectory of FIG. 5A. Thus, the VCM voltage trajectory can be used to measure acceleration.

Figure 6:
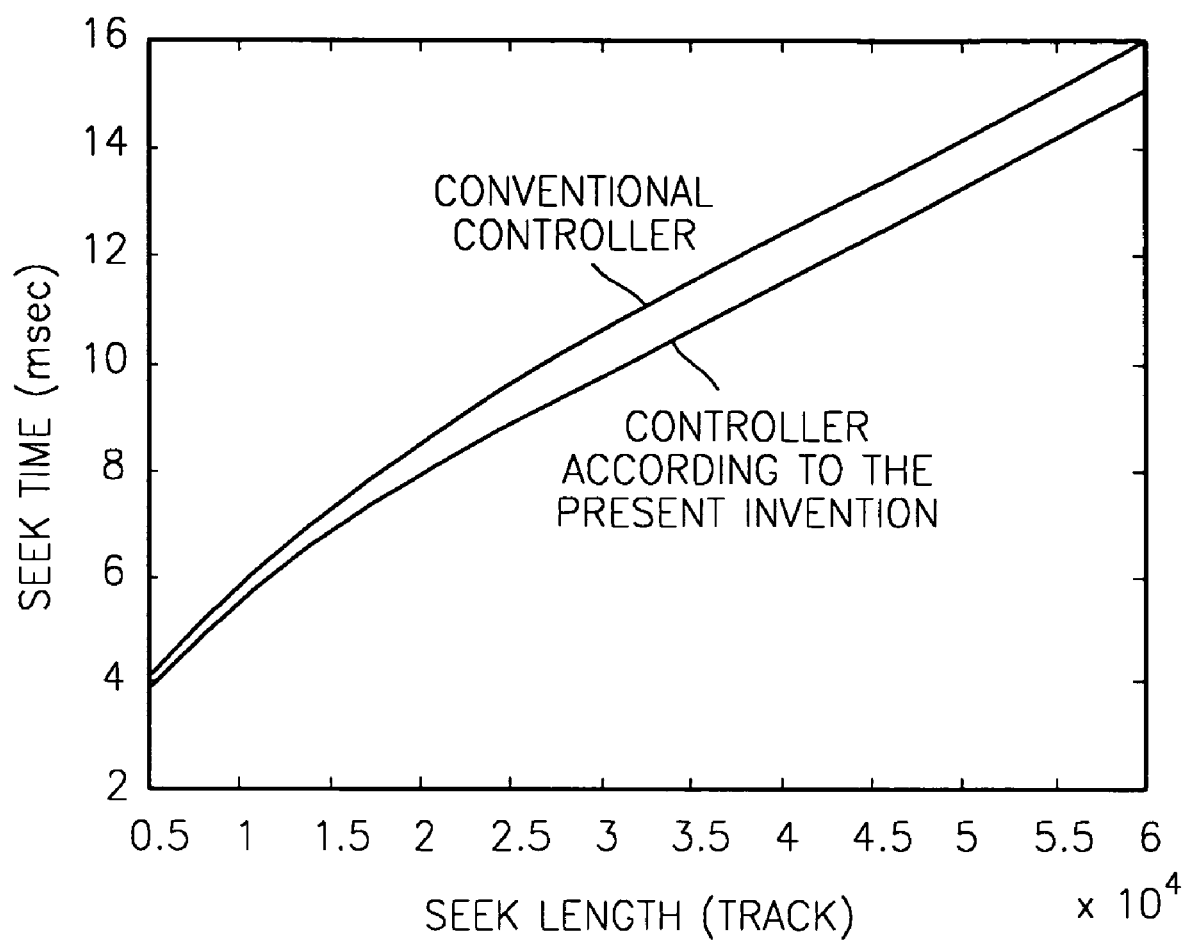
FIG. 6 is a graph showing a seek time obtained according to the conventional seek technique and a seek time obtained according to the seek technique of the present invention.

FIG. 6 shows a track seek time obtained by track seek control, according to the embodiment of the present invention, using an asymmetrical sine wave acceleration trajectory, and a track seek time obtained by conventional track seek control using a symmetrical sine wave acceleration trajectory. As shown in FIG. 6, the seek control technique according to the embodiment of the present invention obtains a track seek time that is about 1 msec less than that obtained using the conventional seek control technique.

As described above, in the embodiment of the present invention, a movement of a transducer to the space over a target track of a disk drive is controlled using an asymmetrical sine wave acceleration trajectory. Hence, a VCM voltage can be equally used in both positive and negative directions within a given voltage limit. Thus, the track seek control technique according to the present invention can reduce track seek time as compared with a conventional track seek control technique using a symmetrical sine wave acceleration trajectory, and can reduce mechanical noise as compared with a conventional track seek technique using a square wave acceleration trajectory.

The present invention can be implemented as a method, an apparatus, and a system. When the present invention is implemented in software, its component elements are code segments that execute necessary operations. Programs or code segments can be stored in processor readable media and can be transmitted via a computer data signal that is combined with a carrier wave in a transmission medium or in a communication network. The processor readable medium can be any medium that can store or transmit data. Examples of the processor readable medium include electronic circuits, semiconductor memory devices, ROMs, flash memories, erasable ROMs (EROMs), floppy disks, optical disks, hard disks, optical fibers, radio frequency (RF) networks, etc. The computer data signal can be any signal that can be transmitted via transmission media, such as electronic network channels, optical fibers, air, an electronic field, RF networks, etc.

Although an embodiment of the present invention has been shown and described, it would be appreciated by those skilled in the art that changes may be made in this embodiment without departing from the principles and spirit of the invention, the scope of which is defined in the claims and their equivalents.

What is claimed is:

1. A method of controlling a track seek servo of a disk drive having a transducer and a disk with a plurality of tracks, comprising moving the transducer to a space over a target track of the plurality of tracks according to a track seek controlling process in which an asymmetrical sine wave acceleration trajectory a(t) is used in a track seek mode.

2. The method according to claim 1, wherein the asymmetrical sine wave acceleration trajectory has a degree of acceleration that is less than a degree of deceleration.

3. The method according to claim 1, wherein the asymmetrical sine wave acceleration trajectory has an acceleration section with a greater duration than that of a deceleration section.

4. The method according to claim 1, wherein the asymmetrical sine wave acceleration trajectory has a degree of acceleration that is less than a degree of deceleration, and an acceleration section with a greater duration than that of a deceleration section.

5. A method of controlling a track seek servo of a disk drive having a transducer and a disk with a plurality of tracks, comprising moving the transducer to a space over a target track of the plurality of tracks according to a track seek controlling process in which an asymmetrical sine wave acceleration trajectory a(t) is used in a track seek mode; and obtaining the asymmetrical sine wave acceleration trajectory a(t), and a velocity trajectory v(t) and a position trajectory x(t) that are based on the acceleration trajectory a(t), according to:

$$a(t) = \begin{cases} K_a I_a \sin\left[\frac{\pi}{T_a} t\right], & 0 \le t \le T_a \\ -K_a I_d \sin\left(\frac{\pi}{T_d}(t - T_a)\right), & T_a \le t \le T_a + T_d \end{cases}$$

$$v(t) = \begin{cases} \frac{K_a I_a T_a}{\pi}\left[1 - \cos\left(\frac{\pi}{T_a} t\right)\right], & 0 \le t \le T_a \\ \frac{2 K_a I_a T_a}{\pi} + \frac{K_a I_d T_d}{\pi}\left[\cos\left(\frac{\pi}{T_d}(t - T_a)\right) - 1\right], & T_a \le t \le T_a + T_d \end{cases}$$

$$x(t) = \begin{cases} \frac{K_a I_a T_a}{\pi}\left[t - \frac{T_a}{\pi}\sin\left(\frac{\pi}{T_a} t\right)\right], & 0 \le t \le T_a \\ \frac{K_a I_a T_a^2}{\pi} + \frac{2 K_a I_a T_a - K_a I_d T_d}{\pi}(t - T_a) + \frac{K_a I_d T_d^2}{\pi^2}\sin\left(\frac{\pi}{T_d}(t - T_a)\right), & T_a \le t \le T_a + T_d \end{cases}$$

wherein $KaI_a$, $I_d$, $T_a$, and $T_d$ denote an acceleration constant, an acceleration current amplitude, a deceleration current amplitude, an acceleration time, and a deceleration time, respectively.

6. An apparatus controlling a track seek servo of a disk drive having a transducer, a disk, and a voice coil, the apparatus comprising:

a seek trajectory producer calculating a design position value, a design velocity value, and a design acceleration value by applying an asymmetrical sine wave acceleration trajectory function a(t) in a track seek mode;

a state estimator determining an actual position value, an actual velocity value, and an actual bias value of the transducer as the transducer moves over the disk;

a first adder subtracting the actual position value from the design position value;

a position control gain compensator obtaining a position correction value by multiplying a resultant value output from the first adder by a predetermined position gain for position correction;

a second adder adding the position correction value to the design velocity value and subtracting the actual velocity value from the sum of the position correction value and the design velocity value;

a velocity control gain compensator obtaining a velocity correction value by multiplying a resultant value output from the second adder by a predetermined velocity gain for velocity correction;

a third adder adding the velocity correction value to the design acceleration value and subtracting the actual bias value from the sum of the velocity correction value and the design acceleration value to obtain an acceleration correction value; and an actuator varying a value of current supplied to the voice coil depending on the acceleration correction value to control movement of the transducer.

7. The apparatus according to claim 6, wherein the asymmetrical sine wave acceleration trajectory has a degree of acceleration that is less than a degree of deceleration.

8. The apparatus according to claim 6, wherein the asymmetrical sine wave acceleration trajectory has an acceleration section with a greater duration than that of a deceleration section.

9. The apparatus according to claim 6, wherein the asymmetrical sine wave acceleration trajectory has a degree of acceleration that is less than a degree of deceleration, and an acceleration section with a greater duration than that of a deceleration section.

10. The apparatus according to claim 6, wherein the asymmetrical sine wave acceleration trajectory a(t), and a velocity trajectory v(t) and a position trajectory x(t) based on the acceleration trajectory a(t), are given by:

$$a(t) = \begin{cases} K_a I_a \sin\left[\frac{\pi}{T_a}t\right], & 0 \leq t \leq T_a \\ -K_a I_d \sin\left(\frac{\pi}{T_d}(t-T_a)\right), & T_a \leq t \leq T_a + T_d \end{cases}$$

$$v(t) = \begin{cases} \frac{K_a I_a T_a}{\pi}\left[1 - \cos\left(\frac{\pi}{T_a}t\right)\right], & 0 \leq t \leq T_a \\ \frac{2K_a I_a T_a}{\pi} + \frac{K_a I_d T_d}{\pi}\left[\cos\left(\frac{\pi}{T_d}(t-T_a)\right) - 1\right], & T_a \leq t \leq T_a + T_d \end{cases}$$

$$x(t) = \begin{cases} \frac{K_a I_a T_a}{\pi}\left[t - \frac{T_a}{\pi}\sin\left(\frac{\pi}{T_a}t\right)\right], & 0 \leq t \leq T_a \\ \frac{K_a I_a T_a^2}{\pi} + \frac{2K_a I_a T_a - K_a I_d T_d}{\pi}(t-T_a) + \frac{K_a I_d T_d^2}{\pi^2}\sin\left(\frac{\pi}{T_d}(t-T_a)\right), & T_a \leq t \leq T_a + T_d \end{cases}$$

wherein $KaI_a$, $I_d$, $T_a$, and $T_d$ denote an acceleration constant, an acceleration current amplitude, a deceleration current amplitude, an acceleration time, and a deceleration time, respectively.

11. A disk drive comprising:
a disk storing data, the disk having a plurality of tracks;
a spindle motor rotating the disk;
a transducer writing data and reading data to and from the disk;
an actuator moving the transducer over a surface of the disk; and
a controller controlling the actuator to move the transducer from a space over a present track of the plurality of tracks to a space over a target track of the plurality of tracks using an asymmetrical sine wave acceleration trajectory a(t).

12. The disk drive according to claim 11, wherein the asymmetrical sine wave acceleration trajectory has a degree of acceleration that is less than a degree of deceleration.

13. The disk drive according to claim 11, wherein the asymmetrical sine wave acceleration trajectory has an acceleration section with a greater duration than that of a deceleration section.

14. The disk drive according to claim 11, wherein the asymmetrical sine wave acceleration trajectory has a degree of acceleration that is less than a degree of deceleration, and an acceleration section with a greater duration than that of a deceleration section.

15. A disk drive comprising:
a disk storing data, the disk having a plurality of tracks;
a spindle motor rotating the disk;
a transducer writing data and reading data to and from the disk;
an actuator moving the transducer over a surface of the disk; and
a controller controlling the actuator to move the transducer from a space over a present track of the plurality of tracks to a space over a target track of the plurality of tracks using an asymmetrical sine wave acceleration trajectory a(t);
wherein the asymmetrical sine wave acceleration trajectory a(t), and a velocity trajectory v(t) and a position trajectory x(t) based on the acceleration trajectory a(t), are given by:

$$a(t) = \begin{cases} K_a I_a \sin\left[\frac{\pi}{T_a}t\right], & 0 \le t \le T_a \\ -K_a I_d \sin\left(\frac{\pi}{T_d}(t-T_a)\right), & T_a \le t \le T_a + T_d \end{cases}$$

$$v(t) = \begin{cases} \frac{K_a I_a T_a}{\pi}\left[1 - \cos\left(\frac{\pi}{T_a}t\right)\right], & 0 \le t \le T_a \\ \frac{2K_a I_a T_a}{\pi} + \frac{K_a I_d T_d}{\pi}\left[\cos\left(\frac{\pi}{T_d}(t-T_a)\right) - 1\right], & T_a \le t \le T_a + T_d \end{cases}$$

$$x(t) = \begin{cases} \frac{K_a I_a T_a}{\pi}\left[t - \frac{T_a}{\pi}\sin\left(\frac{\pi}{T_a}t\right)\right], & 0 \le t \le T_a \\ \frac{K_a I_a T_a^2}{\pi} + \frac{2K_a I_a T_a - K_a I_d T_d}{\pi}(t-T_a) + \frac{K_a I_d T_d^2}{\pi^2}\sin\left(\frac{\pi}{T_d}(t-T_a)\right), & T_a \le t \le T_a + T_d \end{cases}$$

wherein $KaI_a$, $I_d$, $T_a$, and $T_d$ denote an acceleration constant, an acceleration current amplitude, a deceleration current amplitude, an acceleration time, and a deceleration time, respectively.

16. A computer-readable storage controlling a computer to control a track seek servo of a disk drive having a transducer and a disk with a plurality of tracks, the computer-readable storage comprising a process of moving a transducer to a space over a target track of the plurality of tracks according to a track seek controlling process in which an asymmetrical sine wave acceleration trajectory a(t) is used in a track seek mode.

17. The computer-readable storage according to claim 16, wherein the asymmetrical sine wave acceleration trajectory has a degree of acceleration that is less than a degree of deceleration.

18. The computer-readable storage according to claim 16, wherein the asymmetrical sine wave acceleration trajectory has an acceleration section with a greater duration than that of a deceleration section.

19. The computer-readable storage according to claim 16, wherein the asymmetrical sine wave acceleration trajectory has a degree of acceleration that is less than a degree of deceleration, and an acceleration section with a greater duration than that of a deceleration section.

20. A computer-readable storage controlling a computer to control a track seek servo of a disk drive having a transducer and a disk with a plurality of tracks, the computer-readable storage comprising a process of moving a transducer to a space over a target track of the plurality of tracks according to a track seek controlling process in which an asymmetrical sine wave acceleration trajectory a(t) is used in a track seek mode; and obtaining the asymmetrical sine wave acceleration trajectory a(t), and a velocity trajectory v(t) and a position trajectory x(t) that are based on the acceleration trajectory a(t), according to:

$$a(t) = \begin{cases} K_a I_a \sin\left[\frac{\pi}{T_a}t\right], & 0 \le t \le T_a \\ -K_a I_d \sin\left(\frac{\pi}{T_d}(t-T_a)\right), & T_a \le t \le T_a + T_d \end{cases}$$

$$v(t) = \begin{cases} \frac{K_a I_a T_a}{\pi}\left[1 - \cos\left(\frac{\pi}{T_a}t\right)\right], & 0 \le t \le T_a \\ \frac{2K_a I_a T_a}{\pi} + \frac{K_a I_d T_d}{\pi}\left[\cos\left(\frac{\pi}{T_d}(t-T_a)\right) - 1\right], & T_a \le t \le T_a + T_d \end{cases}$$

$$x(t) = \begin{cases} \frac{K_a I_a T_a}{\pi}\left[t - \frac{T_a}{\pi}\sin\left(\frac{\pi}{T_a}t\right)\right], & 0 \le t \le T_a \\ \frac{K_a I_a T_a^2}{\pi} + \frac{2K_a I_a T_a - K_a I_d T_d}{\pi}(t-T_a) + \frac{K_a I_d T_d^2}{\pi^2}\sin\left(\frac{\pi}{T_d}(t-T_a)\right), & T_a \le t \le T_a + T_d \end{cases}$$

wherein $KaI_a$, $I_d$, $T_a$, and $T_d$ denote an acceleration constant, an acceleration current amplitude, a deceleration current amplitude, an acceleration time, and a deceleration time, respectively.

21. A method of controlling a track seek servo of a disk drive having a transducer, a voice coil, and a disk with a plurality of tracks, comprising moving a transducer to a space over a target track of the plurality of tracks according to a track seek controlling process in which an asymmetrical sine wave current is applied to the voice coil in a track seek mode.

22. The method according to claim 21, wherein the asymmetrical sine wave current has a positive peak current value that is less than an absolute value of a negative peak current value.

23. The method according to claim 21, wherein the asymmetrical sine wave current has a positive section with a greater duration than that of a negative section.

24. The method according to claim 21, wherein the asymmetrical sine wave current has a positive peak current value that is less than an absolute value of a negative peak current value, and a positive section with a greater duration than that of a negative section.

25. A disk drive comprising:
a disk storing data, the disk having a plurality of tracks and a voice coil;
a spindle motor rotating the disk;
a transducer writing data and reading data to and from the disk;
an actuator moving the transducer over a surface of the disk; and
a controller controlling the actuator to move the transducer from a space over a present track of the plurality of tracks to a space over a target track of the plurality of tracks by applying an asymmetrical sine wave current to the voice coil.

26. The disk drive according to claim 25, wherein the asymmetrical sine wave current has a positive current value that is less than an absolute value of a negative current value.

27. The disk drive according to claim 25, wherein the asymmetrical sine wave current has a positive section with a greater duration than that of a negative section.

28. The disk drive according to claim 25, wherein the asymmetrical sine wave current has a positive peak current value that is less than an absolute value of a negative peak current value, and a positive section with a greater duration than that of a negative section.

29. A computer-readable storage controlling a computer to control a track seek servo of a disk drive having a transducer, a plurality of tracks, and a voice coil, the computer-readable storage comprising a process of moving a transducer to a space over a target track of the plurality of tracks according to a track seek controlling process in which an asymmetrical sine wave current is applied to the voice coil in a track seek mode.

30. The computer-readable storage according to claim 29, wherein the asymmetrical sine wave current has a positive peak current value that is less than an absolute value of a negative peak current value.

31. The computer-readable storage according to claim 29, wherein the asymmetrical sine wave current has a positive section with a greater duration than that of a negative section.

32. The computer-readable storage according to claim 29, wherein the asymmetrical sine wave current has a positive peak current value that is less than an absolute value of a negative peak current value, and a positive section with a greater duration than that of a negative section.

33. The disk drive according to claim 11, further comprising:
a slider receiving the transducer and generating an air bearing in a space between the transducer and the surface of the disk;
a head gimbal assembly receiving the slider;
an actuator arm of the actuator attached to the head gimbal assembly and having a voice coil; and
a bearing assembly, the actuator arm rotating around the bearing assembly when current is supplied to the voice coil.

34. An electrical system controlling a hard disk drive having a transducer, a voice coil motor with a voice coil, and a disk with a plurality of tracks, the electrical system comprising:
a controller controlling movement of the transducer from a current one of the tracks to a target one of the tracks using an asymmetrical sine wave acceleration trajectory;
a read/write channel connected to the controller and receiving a control signal from the controller to read data from, or write data to, the disk; and
a voice coil motor driver, the controller supplying a driving current to the voice coil and supplying a control signal to the voice coil motor driver to control movement of the transducer.

* * * * *

UNITED STATES PATENT AND TRADEMARK OFFICE
CERTIFICATE OF CORRECTION

| | | |
|---|---|---|
| PATENT NO. | : 7,203,029 B2 | Page 1 of 1 |
| APPLICATION NO. | : 10/766946 | |
| DATED | : April 10, 2007 | |
| INVENTOR(S) | : Seung-Chul Park et al. | |

It is certified that error appears in the above-identified patent and that said Letters Patent is hereby corrected as shown below:

Title Page, item 56, Column 2 (Other Publications), Line 1, before "The" insert --Examiner Ressenaar, J-P,--.

Column 10, Line 44, change "$KaI_a$," to --$K_a$, $I_a$,--.

Column 11, Line 59, change "$KaI_a$," to --$K_a$, $I_a$,--.

Column 13, Line 19, change "$KaI_a$," to --$K_a$, $I_a$,--.

Column 14, Line 47, change "$KaI_a$," to --$K_a$, $I_a$,--.

Signed and Sealed this

Thirty-first Day of July, 2007

JON W. DUDAS
*Director of the United States Patent and Trademark Office*